United States Patent [19]

Schoenholz et al.

[11] 3,914,197

[45] Oct. 21, 1975

[54] PROTECTIVE COATING COMPOSITION

[75] Inventors: Daniel Schoenholz, Basking Ridge; Arthur W. Petersen, Florham Park; Leonard Hirschberger, Marlboro, all of N.J.

[73] Assignee: American Cyanamid Company, Stamford, Conn.

[22] Filed: Apr. 8, 1974

[21] Appl. No.: 459,150

[52] U.S. Cl.............. 260/28.5 A; 106/6; 106/10; 106/11; 117/148; 117/149
[51] Int. Cl.² ........................................ C08L 91/06
[58] Field of Search ....... 106/6, 10, 11; 260/28.5 A; 117/148, 149

[56] References Cited
UNITED STATES PATENTS

| | | | |
|---|---|---|---|
| 404,387 | 6/1889 | Despain | 106/11 |
| 737,015 | 8/1903 | Paxton | 106/11 |
| 1,986,243 | 1/1935 | Arveson | 106/11 |
| 2,839,482 | 6/1958 | Geen et al. | 106/6 |

OTHER PUBLICATIONS

The Chemistry & Technology of Waxes, Worth, pp. 827 and 828, Reinhold Publishing Corp., New York, 1956.

*Primary Examiner*—Melvyn I. Marquis
*Attorney, Agent, or Firm*—Charles J. Fickey

[57] ABSTRACT

A protective coating composition is provided comprising an organic solvent, from about 2 to 25 percent by weight of a condensed hydrocarbon resin, and from about 1 to 50 percent by weight of mineral oil; said condensed hydrocarbon resin having a melting point in the range of about 100° to 150°C., and being a member selected from the group consisting of (a) essentially saturated, organic solvent soluble, thermoplastic polymers of styrene and, optionally meta-substituted benzenes, copolymerized with higher alkenes derived from petroleum cracking operations, and (b) partially unsaturated organic solvent soluble, thermoplastic polymers of beta-pinene or dipentene.

9 Claims, No Drawings

PROTECTIVE COATING COMPOSITION

Generally stated, the subject matter of the present invention relates to an improved, mar-resistant, high gloss protective coating composition for hard surfaces. More particularly, the invention relates to an improved resin-containing protective coating composition which finds particular utility as a furniture polish.

BACKGROUND OF THE INVENTION

Many commercially successful protective coating compositions are available and they vary in their ability to accomplish the results desired in a polish, that is, to protect the surface against water and oil-based stains, to provide high gloss with good gloss retention, to be smear and mar-resistant, to hide or cover scratches, and to be readily buffed to restore gloss.

One of the major properties desired in a protective coating composition for a surface such as wood is the ability to hide or cover scratches, particularly small, narrow surface scratches which penetrate the surface finish, and a second is good gloss and gloss retention. It is well known to incorporate emulsified mineral oil and various waxes in polishing compositions, the former to provide gloss and the latter to provide protection and to reduce the greasiness of the mineral oil. The greasiness of mineral oil is undesirable, and many waxes easily smudge and also cause wax buildup, which may require eventual stripping to restore the wood to its characteristic beauty. Silicones are often used to provide additional polishing, reduce buffing and primarily to resist water spotting.

One or more solvents are commonly used in such compositions, which are made available in either emulsion or aerosol form to provide uniform surface application of the various components of the composition, particularly waxes and resins.

It is, therefore, a primary object of this invention to provide a protective coating composition which has the ability to hide or cover scratches.

Another object of this invention is to provide a protective coating composition which can effect good gloss with gloss retention.

Still another object of this invention is to provide a new and improved protective coating composition which can protect a surface against water and oil-based stains, as well as being smear and mar-resistant.

Yet another object of this invention is to provide a protective coating composition which can be readily buffed to restore gloss.

Additional objects and advantages will be set forth in part in the description which follows, and in part will be obvious from the description, or may be learned by practice of the invention, the objects and advantages being realized and attained by means of the compositions, processes and improvements particularly pointed out in the appended claims.

THE INVENTION

To achieve the foregoing objects and in accordance with its purpose, this invention as embodied and broadly described, provides a protective coating composition comprising an organic solvent, from about 2 to 25 percent by weight of a condensed hydrocarbon resin, and from about 1 to 50 percent by weight of mineral oil; said condensed hydrocarbon resin having a melting point in the range of about 100° to 150°C., and being a member selected from the group consisting of (a) essentially saturated, organic solvent soluble, thermoplastic polymers of styrene and, optionally meta-substituted benzenes, copolymerized with higher alkenes derived from petroleum cracking operations, and (b) partially unsaturated organic solvent soluble, thermoplastic polymers of betapinene or dipentene.

The composition of the present invention contains a novel resin composition which provides a very high degree of scratch hiding ability, thereby rendering the composition particularly useful as a polish for wood surfaces. In essence, the composition appears to restore wood surfaces and to "fill in" or "hide" scratches or nicks in wood. In addition, the composition provides high initial gloss, high gloss retention, has excellent ability to remove both water and oil-based stains and to remove excessive old polish deposits. It also provides easy applicability, either in liquid or aerosol form, produces long lasting shine, without a material buildup of wax.

The novel resins which are used in the polish composition of this invention are thermoplastic, synthetic, hydrocarbon resins based on the polymerization of olefinic fractions derived from petroleum cracking operations. They have a low order of internal unsaturation, the double bonds being almost entirely eliminated by cross-linking, to provide polymers with a low order of reactivity. Examples of such polymers are those derived by copolymerization of aliphatic olefins with styrene or meta-substituted benzenes. A preferred class of polymers are those available from Pennsylvania Industrial Chemical Corporation, known as Picco 6000 Series Resins. Preferred resins are those having a melting point in the range of about 100°to 150°C., particularly those melting at from about 130°–150°C.

Similarly thermoplastic resins which are produced by polymerization or terpene hydrocarbons, consisting primarily of beta-pinene and dipentene, may also be advantageously used instead of the preferred resins referred to hereinabove. The major differences between those polymers based on beta-pinene and dipentene is molecular structure, both types being available in the desired melting point range and having utility in the polish compositions of this invention. The beta pinene polymers have the repeating structural unit (A) and those from dipentene, structural unit (B).

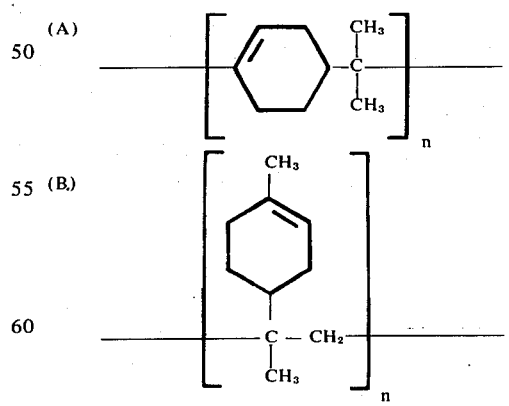

where $n$ is the number of repeating units or degree of polymerization.

The beta pinene polymers contain unsaturation to a greater extent than those from dipentene, some of the unsaturation in the latter is consumed during polymerization by the mechanism postulated below:

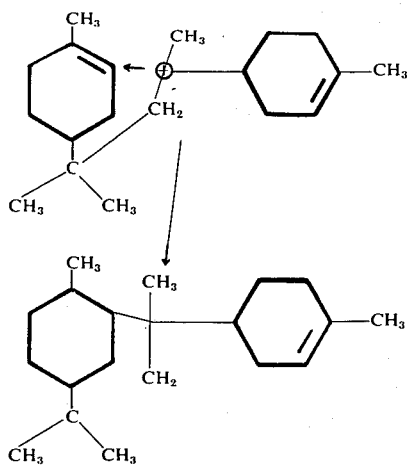

Resins of the type described are available commercially from Arizona Chemical Company, and are known as Zonarex® Polyterpene Resins.

The resins are used in the polish composition of the invention at a level of from about 2 to 25 percent by weight, based on the total weight of the composition. The preferred range is from about 7 to 17 percent.

As employed in the instant specification and claims, the term mineral oil shall be defined as that liquid product of mineral origin that is within the viscosity limits recognized for oils as petroleum, shale oil or any oil obtained from them by refining. Included within this definition are the naphthenic, aromatic and paraffinic oils. The mineral oil is used in a concentration of from about 1 to 50 percent by weight. The preferred range is from about 10 to 30 percent by weight. Minimum scratch hiding ability is achieved by at least 5 percent by weight.

In addition to the resin component of the polish composition, a wax can be used to provide additional surface protection. It has been found that solvent soluble waxes, useful for aerosol application, such as poly(octadecyl vinyl ether) having a melting point in the ranges of about 45°–50°C. are particularly useful. Montan waxes and carnauba waxes are not suitable. The wax may be used in an amount of about 1 to 5 percent by weight, preferably 2 to 3 percent.

Certain polysiloxanes may be used in the compositions to provide additional polishing ability and to provide protection against water stains. Dimethylpolysiloxanes having viscosity in the range of about 100 to 10,000 centistokes (CTS), preferably 100 to 5000 centistokes (CTS), and still more preferably 100 to 2000 CTS are useful in this invention. The dimethylpolysiloxanes are used in an amount of about 2 to 5 percent by weight, preferably 2 to 3 percent.

Various organic solvents, as are commonly used in the art, are included to dissolve the resin and wax and to aid in surface distribution and to assist in providing shine. Illustrative of such solvents are mineral spirits and 1,1,1-trichloroethane among others. In the present invention, a mixture of solvents is used to provide even distribution of the solid components and slow evaporation to provide a hard surface layer and good buffing.

The following examples are provided for illustrative purposes and they may include particular features of the invention. However, the examples should not be construed as limiting the invention, many variations of which are possible without departing from the spirit or scope thereof.

EXAMPLE I

The following polish composition was prepared and evaluated:

| Ingredient | Weight % |
| --- | --- |
| Condensed hydrocarbon resin (Picco 6140-3; Penn. Industrial Chem.) | 12.0 |
| Polyvinyl ether of octadecyl alcohol (V wax; American Hoechst Co.) | 2.0 |
| Oleic acid | 2.0 |
| Dimethylpolysiloxane 1000 cst (Dow Corning Corp.) | 3.0 |
| Naphthenic processing oil (Tufflo 500; Atlantic Richfield) | 15.0 |
| Mineral spirits (AMSCO) | 42.0 |
| 1,1,1-Trichloroethane (Chlorothene N.U.; Dow Chem. Co.) | 24.0 |
|  | 100.0 |

EXAMPLE II

Evaluation of Scratch Hiding Ability

The composition of Example I was evaluated for scratch hiding ability against two competitive, successful polish compositions.

Two wood table tops, representing light and dark finishes, were cleaned thoroughly with an aliphatic hydrocarbon solvent. An edge of a file, held into place by a jig permitting application of a uniform force, was used to produce scratches under various loads from 1000 to 5000 grams. This produced a series of scratches ranging in severity from narrow scratch to a deep wide scratch.

Competitive Product A and Competitive Product B were applied as directed on their respective labels. Competitive Product A (an aerosol) was sprayed onto the test area and wiped immediately with a soft clean cotton diaper cloth. Competitive Product B (non-aerosol) was applied liberally with a clean cloth, allowed to stand for 1 hour, and wiped dry with a soft, clean cotton diaper cloth.

The composition of Example I was applied liberally in about the same amount of Product B, allowed to stand two minutes, and then buffed with a clean cloth.

The test areas were viewed immediately after application of the polishes and 24 hours after application. Results showed that the composition of Example I and Competitive Product B were equivalent in their ability to hide narrow scratches. Competitive Product A had poor scratch hiding ability.

EXAMPLE III

Evaluation of Initial Gloss

Three wood table tops (representing dark, medium and light finishes) were thoroughly cleaned with an aliphatic hydrocarbon solvent. Competitive Product A was sprayed onto the test area as directed on the label and wiped immediately with a clean cotton diaper cloth. The composition of Example I was applied liberally, allowed to stand for 2 minutes and buffed with a clean cotton diaper cloth.

Specular gloss measurements, using a Gardner Glossmeter −60°, were obtained before and after application. The unit increase in gloss was then calculated. The results are shown in Table 1.

TABLE 1

| | Specular Gloss — 60 Degree | | |
|---|---|---|---|
| | Initial | After | Unit Increase |
| Competitive Product A | | | |
| Table 1 | 63 | 72 | 9 |
| 2 | 59 | 68 | 9 |
| 3 | 57 | 69 | 12 |
| Composition of Ex. 1 | | | |
| Table 1 | 60 | 74 | 14 |
| 2 | 58 | 80 | 22 |
| 3 | 58 | 80 | 22 |

From the above data, the polish composition of Example I is superior to Competitive Product A in gloss characteristics.

EXAMPLE IV

Evaluation of Gloss Retention

Following a procedure similar to Example III, Competitive Product A was sprayed on the test area and wiped immediately with a soft cloth. Competitive Product B and the Compsition of Example I were applied liberally (about the same amount) with a clean cloth; Product B was allowed to stand for 1 hour and the composition of Example I for 2 minutes, then both wiped dry with a clean cloth.

Specular gloss measurements, using a Gardner Glossmeter −60°, were obtained on the solvent cleaned test area, immediately after application, 24 hours after application, and 4 days after application of the polishes. Results are shown in Table 2.

TABLE 2

| | Specular Gloss — 60 Degree | | | | | | |
|---|---|---|---|---|---|---|---|
| | Initial | Immed. After Applic. | Unit Increase | 24 Hrs. After Applic. | % Loss[1] in Gloss | Four Days After Applic. | % Loss[1] in Gloss |
| Competitive Product A | | | | | | | |
| Table 1 | 63 | 72 | 9 | 70 | 22.2 | 69 | 33.3 |
| Table 2 | 59 | 68 | 9 | 66 | 22.2 | 65 | 33.3 |
| Table 3 | 57 | 69 | 12 | 67 | 16.7 | 66 | 25.0 |
| Competitive Product B | | | | | | | |
| Table 1 | 65 | 69 | 4 | 68 | 25.0 | 66 | 75.0 |
| Table 2 | 61 | 71 | 10 | 62 | 20.0 | 61 | 100.0 |
| Table 3 | 59 | 73 | 14 | 61 | 85.7 | 60 | 93.0 |
| Example 1 | | | | | | | |
| Table 1 | 60 | 74 | 14 | 71 | 21.4 | 70 | 28.6 |
| Table 2 | 59 | 79 | 20 | 76 | 15.0 | 75 | 20.0 |
| Table 3 | 58 | 80 | 22 | 77 | 13.6 | 75 | 22.7 |

[1] % loss in Gloss = $\dfrac{\text{Unit increase in gloss after initial applic.} - \text{unit increase after aging}}{\text{unit increase after initial applic.}} \times 100$

We claim:

1. A protective coating composition consisting essentially of, by weight, from about 7 to 17 percent of a condensed hydrocarbon resin, from about 1 to 5 percent of an organic solvent soluble wax having a melting point in the range of about 45° to 50°C., from about 2 to 5 percent of polydimethyl siloxane having a viscosity in the range of from about 100 to 10,000 centistokes, from about 10 to 30 percent of mineral oil, and the remainder comprising an organic solvent; said condensed hydrocarbon resin having a melting point in the range of about 100° to 150°C., and being a member selected from a group consisting of (a) essentially saturated, organic solvent soluble, thermoplastic polymers of styrene and, optionally meta-substituted benzenes, copolymerized with higher alkenes derived from petroleum cracking operations, and (b) partially unsaturated organic solvent soluble, thermoplastic polymers of betapinene or dipentene.

2. The composition according to claim 1 wherein said condensed hydrocarbon resin is an essentially saturated, organic, solvent soluble, thermoplastic polymer of styrene and, optionally meta-substituted benzenes, copolymerized with higher alkenes derived from petroleum cracking operations.

3. The composition according to claim 1 wherein the concentration of the condensed hydrocarbon resin is 12 percent by weight, based on the weight of the total composition.

4. The composition according to claim 1 wherein said wax is poly(octadecyl vinyl ether).

5. A composition according to claim 4 wherein the concentration of said wax is 2 percent by weight, based on the weight of the total composition.

6. The composition according to claim 1 wherein the polydimethyl siloxane has a viscosity of 1,000 centistokes.

7. The composition according to claim 6 wherein the concentration of the polydimethyl siloxane is 3 percent by weight, based on the weight of the total composition 8. The composition according to claim 1 wherein the organic solvent constitutes a mixture of mineral spirits and 1,1,1-trichloroethane.

9. A method for polishing wood surfaces which comprises applying to such surfaces the composition of claim 1.

* * * * *